(12) United States Patent
Ledingham et al.

(10) Patent No.: US 9,178,556 B2
(45) Date of Patent: Nov. 3, 2015

(54) NECK CORD INCORPORATING EARTH PLANE EXTENSIONS

(75) Inventors: Stephen Ledingham, Waltham, MA (US); Richard Alexander Cote, Bolton, MA (US)

(73) Assignee: Koninklijke Philips N.V., Eindhoven (NL)

( * ) Notice: Subject to any disclaimer, the term of this patent is extended or adjusted under 35 U.S.C. 154(b) by 61 days.

(21) Appl. No.: 14/117,858

(22) PCT Filed: May 10, 2012

(86) PCT No.: PCT/IB2012/052330
§ 371 (c)(1),
(2), (4) Date: Nov. 15, 2013

(87) PCT Pub. No.: WO2012/156872
PCT Pub. Date: Nov. 22, 2012

(65) Prior Publication Data
US 2014/0080545 A1    Mar. 20, 2014

Related U.S. Application Data

(60) Provisional application No. 61/608,889, filed on Mar. 9, 2012, provisional application No. 61/487,024, filed on May 17, 2011.

(51) Int. Cl.
*H04B 1/38* (2015.01)
*H04B 1/3827* (2015.01)
(Continued)

(52) U.S. Cl.
CPC .............. *H04B 1/385* (2013.01); *H01Q 1/243* (2013.01); *H01Q 1/273* (2013.01); *H01Q 1/44* (2013.01); *H01Q 1/48* (2013.01); *H04M 1/0202* (2013.01)

(58) Field of Classification Search
CPC ................................. H04M 1/05; H04B 1/385
USPC ................. 455/569.1, 550.1, 90.2, 90.3, 100, 455/575.1, 575.6, 575.7, 556.1, 344
See application file for complete search history.

(56) References Cited

U.S. PATENT DOCUMENTS 2,529,213 A    11/1950  Lyons
6,707,924 B1 *  3/2004  Okiebisu ...................... 381/385
(Continued)

FOREIGN PATENT DOCUMENTS

EP    1447879 A1    8/2004
EP    2365581 A2    9/2011
(Continued)

OTHER PUBLICATIONS

Reina-Tosina, Javier et al. "Design of antennas for a wearable sensor for homecare movement monitoring", Proceedings of the 28th IEEE, EMBS Annual International Conference, NY, Aug. 30-Sep. 3, 2006.
(Continued)

*Primary Examiner* — Sonny Trinh

(57) ABSTRACT

A mobile device having a printed circuit board, a wireless transceiver, an antenna having an earth plane and coupled to the wireless transceiver, a conductive earth plane extension conductively coupled to the earth plane and a neck cord adapted to support the mobile device from a neck of a user of the device, wherein the conductive earth plane extension is incorporated into the neck cord. Also, an antenna assembly having an antenna having an earth plane, the antenna being adapted to be coupled to a wireless transceiver, a conductive earth plane extension coupled to the earth plane and a neck cord adapted to support a mobile device housing the antenna from a neck of a user of the device, wherein the conductive earth plane extension is incorporated into the neck cord.

15 Claims, 3 Drawing Sheets

(51) Int. Cl.
*H01Q 1/24* (2006.01)
*H01Q 1/44* (2006.01)
*H01Q 1/48* (2006.01)
*H01Q 1/27* (2006.01)
*H04M 1/02* (2006.01)

(56) References Cited

U.S. PATENT DOCUMENTS

| | | | | |
|---|---|---|---|---|
| 7,142,826 | B2* | 11/2006 | Olivier et al. | 455/90.3 |
| 8,081,951 | B1* | 12/2011 | Blum | 455/404.1 |
| 2004/0180631 | A1* | 9/2004 | Lim et al. | 455/90.3 |
| 2006/0166719 | A1 | 7/2006 | Arad et al. | |
| 2008/0007466 | A1 | 1/2008 | Mizutani | |
| 2008/0084356 | A1 | 4/2008 | Korner | |
| 2008/0186246 | A1 | 8/2008 | Lafleur | |
| 2008/0261538 | A1 | 10/2008 | Korner | |
| 2009/0197653 | A1* | 8/2009 | Mizoguch et al. | 455/575.7 |
| 2011/0224976 | A1* | 9/2011 | Taal et al. | 704/205 |

FOREIGN PATENT DOCUMENTS

| | | | |
|---|---|---|---|
| JP | 2006173732 | A1 | 6/2006 |
| WO | 2011092485 | A1 | 8/2011 |

OTHER PUBLICATIONS

Editor—Chen, Zhi Ning. "Antennas for portable devices", Apr. 23, 2007.
Hubaux, J.P. et al. "Proceedings WAMES 2004", Jun. 6, 2004, Boston, MA.
Mitsumi GPS Antenna GPA-CG2C2 Technical Details. 2002.

* cited by examiner

NECK CORD INCORPORATING EARTH PLANE EXTENSIONS

This application is a national stage application under 35 U.S.C. §371 of International Application No. PCT/IB2012/052330 filed on May 10, 2012 and published in the English language on Nov. 22, 2012 as International Publication No. WO/2012/156872, which claims priority to U.S. Application No. 61/608,889 filed on Mar. 9, 2012 and U.S. Application No. 61/487,024 filed on May 17, 2011, the entire disclosures of which are incorporated herein by reference.

Antennas are used to enable wireless communication for a broad variety of devices. Among other factors, the performance of an antenna depends on the size (length, width, diameter, etc.) of the earth plane. Earth plane extensions are commonly used to increase the effective electrical size of the earth plane. FIG. 1 illustrates such an antenna. The antenna 100 includes a vertical monopole antenna 110. The vertical monopole 110 is affixed to an earth plane 120. The earth plane 120 is, in turn, affixed to four earth plane extensions 131, 132, 133 and 134 that may increase the effective size of the earth plane 120, and, thereby, improve the performance of the antenna 100.

In order to be certified for use on a cellular carrier network, mobile devices need to meet requirements relating to signal quality and user safety. Among other factors, the ability of devices to meet such requirements depends on the operational frequency band in which the device will communicate and the physical size of the device. Devices that are intended to be constantly carried or worn by a user present a particular design challenge, as it is especially important to minimize the size and weight of the device.

Mobile devices present a challenge to antenna designers, as antennas must be designed to be as small as possible in order to minimize the size of the mobile device itself. This is particularly a matter of concern for devices that are intended to communicate in the cellular low band (e.g., CDMA2000 or global system for mobile communications ("GSM")), on the order of 850 MHz, because devices with lower operating frequencies will consequently have longer wavelengths. For a device communicating using a frequency having a wavelength $\lambda$, a PCB earth plane on the order of $\lambda/4$ long and $\lambda/8$ wide may be required to radiate effectively. In the frequency range of 850 MHz, this may require an earth plane having the approximate dimensions of 88 mm long and 44 mm wide. It should be noted that the radiating elements are both the antenna and the earth plane in an electrically small device.

In addition, network providers may typically require devices achieve a certain level of total radiated power ("TRP") and total isotropic sensitivity ("TIS"), and devices with antennas not having a substantially optimal size may not achieve the prescribed levels. Manufacturers may request TRP and TIS waivers, but such waivers are discretionary and may not be granted. Additionally, devices having an antenna with an earth plane sized incorrectly may produce highly concentrated currents in the earth plane, which may consequently produce a high specific absorption rate ("SAR"). Devices having a SAR above prescribed levels will not receive a 'Type Certification Review Board' ("PTCRB") approval because SAR limitations are safety requirements.

A personal emergency response system ("PERS"), also referred to as a medical emergency response system, is an electronic device designed to let the user of the device summon help in the event of an emergency. PERS devices are primarily intended for use by elderly or disabled persons, who may feel the need for such a service. PERS devices are intended to be kept on the user's person at all times, such as carried on a cord around the user's neck. Thus, while the device size described above may be acceptable for some mobile device purposes (e.g., a mobile phone), a PERS device of a size necessitated by such an antenna may be prohibitively large and heavy.

Two-device PERS solutions have been developed to remedy the above size-related difficulties. In such solutions, a smaller device including a help button may be worn around the user's neck and paired, such as by a personal area wireless network, with a larger device worn on a belt clip or stored in a pocket or handbag. However, two-device PERS solutions suffer from a number of difficulties. They present more complexity than a single device, and have additional parts, which are susceptible to being lost. Further, they are more expensive to design, build and sustain.

In one exemplary embodiment a mobile device is described as having a printed circuit board, a wireless transceiver, an antenna having an earth plane and coupled to the wireless transceiver, a conductive earth plane extension conductively coupled to the earth plane and a neck cord adapted to support the mobile device from a neck of a user of the device, wherein the conductive earth plane extension is incorporated into the neck cord.

In another exemplary embodiment, an antenna assembly is described as having an antenna having an earth plane, the antenna being adapted to be coupled to a wireless transceiver, a conductive earth plane extension coupled to the earth plane and a neck cord adapted to support a mobile device housing the antenna from a neck of a user of the device, wherein the conductive earth plane extension is incorporated into the neck cord.

Figure 1:
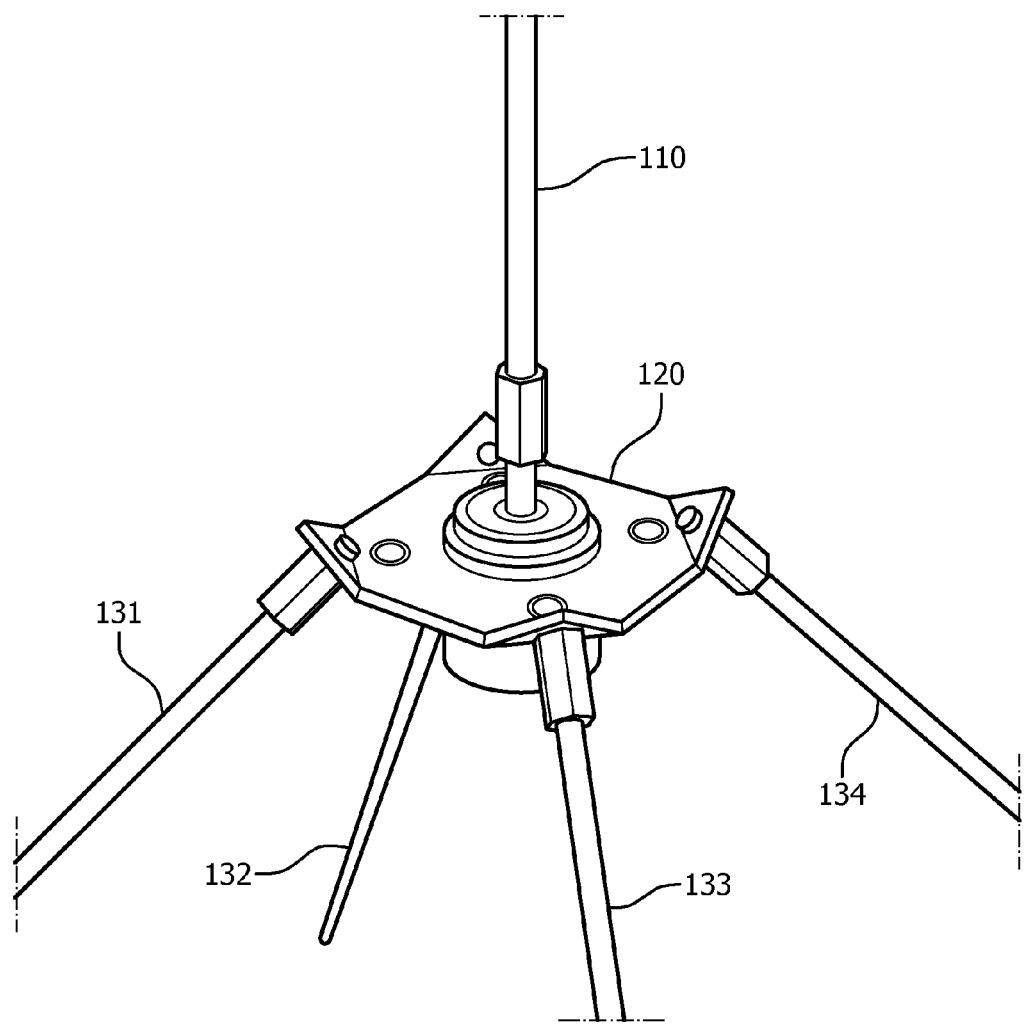
FIG. 1 shows an antenna including earth plane extensions.

The exemplary embodiments may be further understood with reference to the following description and the appended drawings, wherein like elements are referred to with the same reference numerals. The exemplary embodiments describe antennas adapted for use with mobile devices having earth plane extensions incorporated into neck cords or similar personal accessories (e.g., watches, pendants, etc) suitable for suspending or attaching the mobile device on a user's person, and mobile devices incorporating such antennas which are suitable for providing acceptable levels of performance in both the cellular low and high band, while simultaneously enabling a device to be small enough for PERS use.

Figure 2:
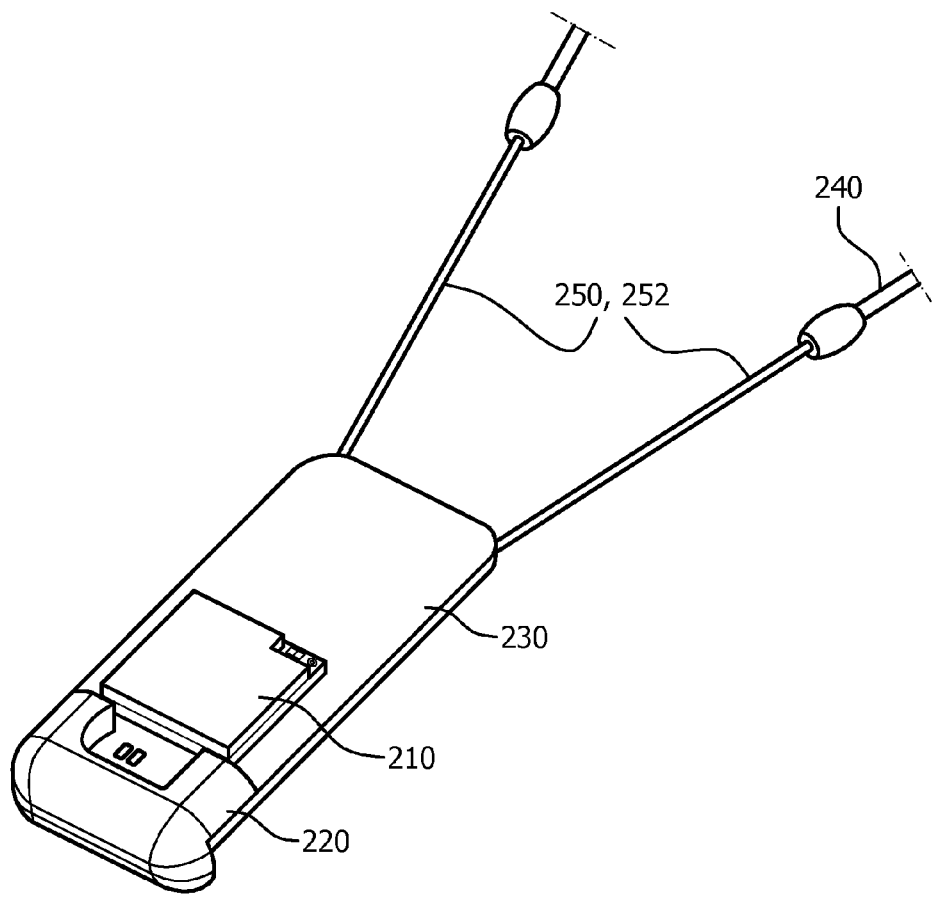
FIG. 2 shows a mobile device including a cord that incorporates earth plane extensions according to an exemplary embodiment of the present disclosure.

FIG. 2 illustrates a mobile device 200 according to an exemplary embodiment. As described above, the device 200 may be a PERS device that is intended to be worn on the user's person at all times. In one embodiment, the device may lack the keypad and display that are commonly found on mobile telephones or cellular phones, but, rather, may simply include a "help" button to be pressed by the user if emergency assistance is required, and a microphone and speaker for communication between the user and the provider of PERS services. The operation of such a device will be discussed below with reference to FIG. 3.

The device 200 includes a wireless transceiver 210 adapted to communicate wirelessly with a cellular network, such as in the cellular low band as described above. Those of skill in the art will understand that, in various embodiments, the wireless transceiver may be adapted to communicate via GSM, 3GTP, CDMA2000, or any other such wireless network. The device 200 also includes an antenna 220, which may typically be connected to the wireless transceiver 210 via a transmission line, but may also be connected by any other appropriate means. The antenna 220 may be of any type known in the art and appropriate for the nature and design of the device 200; this may include an L antenna, an inverted L antenna, a planar inverted F antenna, a loop antenna, a coupled line antenna, a folded monopole, a 3D metal antenna or a helical antenna. In one embodiment, the antenna 220 may be a flexible conductive material fitted to the inside of a housing of the device 200; in another, the antenna 220 may be supported on a plastic carrier within the housing of the device 200; in another, the antenna 220 may be part of the housing of the device 200; in another, the antenna 220 may be part of any three-dimensional conductive structure within the housing of the device 200; in another, the antenna 220 may be printed on the PCB 230, which will be discussed in further detail below.

The device 200 also includes a PCB 230 supporting the antenna 220 and the wireless transceiver 210. The PCB 230 includes a conductive earth plane, and may be coupled to the antenna 220 by a C-clip, a pogo pin, a soldered joint, c-clips, a screw, a nut and bolt, or any other appropriate means of accomplishing an electrical connection between the two.

The device 200 also includes a neck cord 240, which may be appropriately sized to suspend the device 200 around the user's neck. The neck cord 240 may be constructed from manmade or synthetic materials such as nylon, cotton, or any other appropriate material. The device 200 also includes two earth plane extensions 250 and 252 incorporated into the neck cord 240. The conductive material of the earth plane extensions 250 and 252 may be rigid or flexible, and may be single-core or multi-stranded. The length of the earth plane extensions 250 and 252 may typically be less than $\lambda/4$ at the lowest operating frequency of the wireless transceiver 210, because the earth plane extensions 250 and 252 supplement the earth plane of the PCB 230 to form a larger overall effective earth plane, as described above. The earth plane extensions 250 and 252 may be connected to the PCB 230 by a connector, a solder joint, a screw, a nut and bolt or any other appropriate electrical connection. Specifically, the earth plane 230 and the earth plane extensions 250 and 252 combine to satisfy the length and width requirements of the particular radiating frequency. For example, if the mobile device 200 is designed to operate in the frequency range of 850 MHz, the combination of the earth plane 230 and the earth plane extensions 250 and 252 satisfy the requirements that the earth plane be 88 mm long and 44 mm wide. The earth plane extensions can be modified to satisfy other dimensional requirements for other frequencies. In addition, the exemplary embodiments also satisfy the relevant TRP and TIS requirements. The efficiency of the exemplary embodiments with respect to the TRP and TIS is in the range of 70% and also spreads the irradiated energy over a larger part of the body than just the area adjacent the mobile device.

The length and width of the earth plane extensions 250 and 252 may typically be determined by antenna efficiency and bandwidth requirements in order to meet SAR requirements to obtain PTCRB approval, to meet TRP and TIS requirements, and to obtain carrier approval. In one exemplary embodiment, the neck cord 240 and the earth plane extensions 250 and 252 may be coupled to one another end-to-end. In another exemplary embodiment, the earth plane extensions 250 and 252 may be coupled at the PCB and the neck cord coupled at the remaining ends. In another exemplary embodiment, the earth plane extensions 250 and 252 may be embedded into or otherwise covered by the neck cord 240. In a further exemplary embodiment, the earth plane extensions 250 and 252 may be covered by a separate housing (e.g., a flexible plastic housing) that may be coupled with the neck cord 240, and may help support the earth plane extensions 250 and 252.

The embodiment illustrated in FIG. 2 is a device 200 including two earth plane extensions 250 and 252. In another exemplary embodiment, a single wire earth plane extension may be connected at one side of the PCB earth plane (e.g., the device 200 may include earth plane extension 250 but not earth plane extension 252). In a further exemplary embodiment, two earth plane extensions 250 and 252 may be coupled to the PCB at a single junction point and split apart to join the neck cord in a "Y" shape. Additionally, those of skill in the art will understand that the cord-like shape of the earth plane extensions is only exemplary and that other shapes may be integrated into a neck cord to achieve the same results.

It should be noted that the use of the term "neck cord" in this description should not be understood to limit the cord of the device to be worn only around the user's neck. That is while hanging the cord of the device around the neck is typical, the cord may also be worn around other body parts (e.g., around the wrist in the form of a strap) and may be sized appropriately for other body locations. Thus, the cord described herein may refer to a cord that is adapted to be worn by the user of the device at any appropriate body location.

Figure 3:
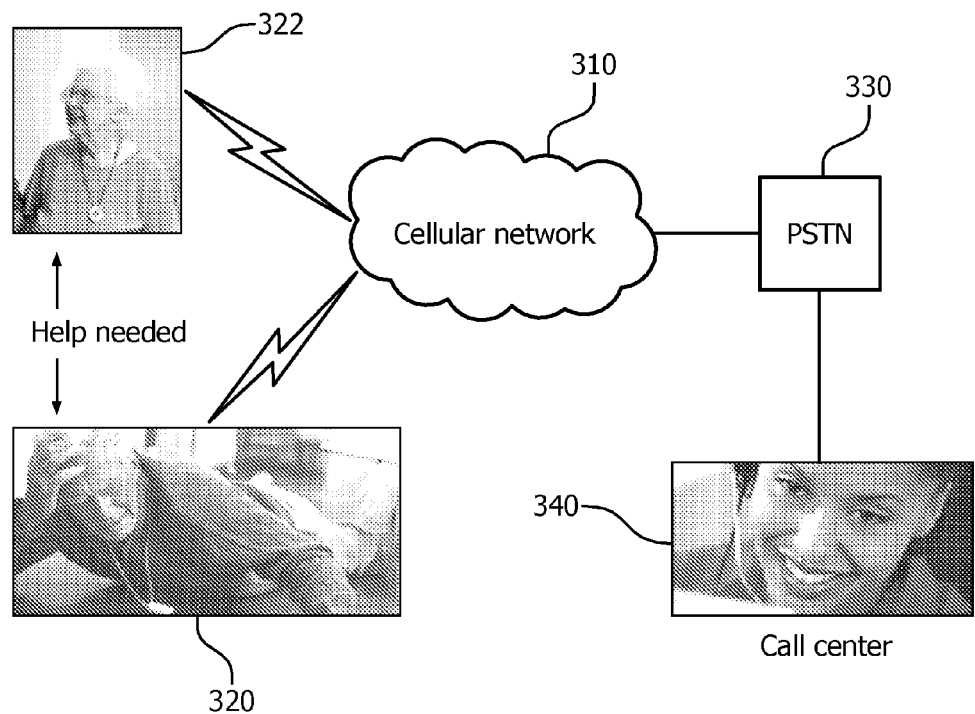
FIG. 3 shows an emergency response system incorporating the exemplary mobile device of FIG. 2 according to an exemplary embodiment of the present disclosure.

FIG. 3 illustrates an exemplary network 300 providing service to devices such as the PERS device 200 of FIG. 2. The network 300 includes a cellular network 310 that may provide service, including text messaging, analog voice, voice over Internet Protocol ("VoIP") and data to cellular phones, mobile computing devices, etc., in addition to PERS devices. The cellular network 310 may be in communication with two or more PERS devices 320 and 322, which may be PERS devices as described above with reference to FIG. 2. The cellular network 310 may provide access to the PSTN 330. The PSTN 330 may also be accessed by a call center 340 providing emergency response services.

When a user of a PERS device, such as PERS device 320, requires emergency assistance (e.g., in the event of a fall or fire), the user may press a button on the device. In another embodiment, the PERS device may include a fall detection system, the activation of which may automatically trigger the device. The PERS device relays a signal via the cellular network 310 and/or the PSTN 330 to the call center 340. The call center 340 may then identify the user through information coded in the transmission and may contact the user via a cellular voice connection provided by the PERS device. If necessary, the call center 340 may subsequently summon assistance (e.g., police, fire department, medical assistance) for the user of the device. If the call center 340 cannot contact the user or determine whether an emergency exists, it will alert emergency service providers to go to the user's home. Typically, the call center 340 may then monitory the situation until the emergency has been resolved.

The exemplary embodiments may provide for a single-device PERS solution using a device that is small enough to be comfortably worn around the user's neck. The single device may be simpler to design and build than two-device solutions. Additionally, the single-device solution provides better battery life than a two-device solution. Further, the performance achieved by a PERS device as described above may provide improved antenna efficiency in terms of TRP, TIS and bandwidth, allowing the device to obtain carrier approval without the need for a waiver. Additionally, the increase in effective earth plane area decreases SAR, which in turn reduces power absorbed into the body of the user. This may make it possible to obtain PTCRB approval and enable safe use of the device without a spacer or other additional space between the device and the user. Further, the use of earth plane extensions may allow an internal device antenna to be smaller, thereby possibly reducing the overall size of the device. Those of skill in the art will understand that while the exemplary embodiments are described specifically with reference to a PERS device, the broader principles described herein may be equally applicable to any other type of mobile communications device having elements similar to those described. Additionally, those of skill in the art will understand that while the exemplary embodiments are described specifically with reference to a device communicating in a cellular band, the broader principles may be equally applicable to a device using another type of radio frequency transmitter, such as a short range radio ("SRD") that may communicate, for example, in industrial, scientific and medical ("ISM") bands.

It will be apparent to those skilled in the art that various modifications may be made to the present disclosure, without departing from the spirit or the scope of the disclosure. Thus, it is intended that the present disclosure cover modifications and variations of this disclosure provided they come within the scope of the appended claims and their equivalents.

What is claimed is:

1. A mobile device, comprising:
   a printed circuit board;
   a wireless transceiver;
   an antenna having an earth plane and coupled to the wireless transceiver;
   a first conductive earth plane extension conductively coupled to the earth plane;
   a second conductive earth plane extension conductively coupled to the earth plane; and
   a neck cord adapted to support the mobile device from a neck of a user of the device, wherein the first conductive earth plane extension is incorporated into a first end of the neck cord and the second conductive earth plane extension is incorporated into a second end of the neck cord.

2. The mobile device of claim 1, wherein the wireless transceiver is adapted to communicate in one of a cellular low band and a cellular high band.

3. The mobile device of claim 1, wherein the first conductive earth plane extension and the second conductive earth plane extension is conductively coupled to the earth plane by one of a connector, a solder joint, a screw, and a nut and bolt.

4. The mobile device of claim 1, wherein the antenna is one of an L antenna, an inverted L antenna, a planar inverted F antenna, a loop antenna, a coupled line antenna, a folded monopole, a 3D metal antenna, and a helical antenna.

5. The mobile device of claim 1, wherein the device further comprises:
   a help button,
   wherein pressing the help button initiates a communication with a call center providing emergency services to the user.

6. The mobile device of claim 1, wherein the first conductive earth plane extension and the second conductive earth plane extension is one of rigid or flexible conductive material.

7. The mobile device of claim 1, wherein the first conductive earth plane extension and the second conductive earth plane extension is one of single-core or multi-stranded conductive material.

8. The mobile device of claim 1, wherein the first conductive earth plane extension is coupled to the earth plane at a first contact point and the second conductive earth plane extension is coupled to the earth plane at a second contact point and where the first conductive earth plane extension and the second conductive earth plane extension are connected in the neck cord to form a loop between the first contact point and the second contact point.

9. The mobile device of claim 1, wherein the first conductive earth plane extension and the second conductive earth plane extension is enclosed by the neck cord and coupled to the neck cord end to end.

10. The mobile device of claim 1, wherein the first conductive earth plane extension and the second conductive earth plane extension is adapted to couple the neck cord to a housing of the mobile device.

11. An antenna assembly, comprising:
    an antenna having an earth plane, the antenna being adapted to be coupled to a wireless transceiver;
    a first conductive earth plane extension coupled to the earth plane;
    a second conductive earth plane extension coupled to the earth plane; and
    a neck cord adapted to support a mobile device housing the antenna from a neck of a user of the device,
    wherein the first conductive earth plane extension is incorporated into a first end of the neck cord and the second conductive earth plane extension is incorporated into a second end of the neck cord.

12. The antenna assembly of claim 11, wherein the antenna is adapted to be coupled to a wireless transceiver communicating in one of a cellular low band and a cellular high band.

13. The antenna assembly of claim 11, wherein the first conductive earth plane extension and the second conductive earth plane extension is conductively coupled to the earth plane by one of a connector, a solder joint, a screw, and a nut and bolt.

14. The antenna assembly of claim 11, wherein the antenna is one of an L antenna, an inverted L antenna, a planar inverted F antenna, a loop antenna, a coupled line antenna, a folded monopole, a 3D metal antenna, and a helical antenna.

15. The antenna assembly of claim 11, wherein the first conductive earth plane extension and the second conductive earth plane extension is one of single-core or multi-stranded conductive material.

\* \* \* \* \*